United States Patent
Landwehr et al.

(10) Patent No.: US 10,364,195 B2
(45) Date of Patent: Jul. 30, 2019

(54) BRAZE FOR CERAMIC AND CERAMIC MATRIX COMPOSITE COMPONENTS

(71) Applicants: Rolls-Royce Corporation, Indianapolis, IN (US); The Curators of the University of Missouri, Columbia, MO (US)

(72) Inventors: Sean E. Landwehr, Avon, IN (US); Scott Nelson, Carmel, IN (US); Jeremy Lee Watts, Rolla, MO (US); Gregory Eugene Hilmas, Rolla, MO (US); William Gene Fahrenholtz, Rolla, MO (US); Derek Scott King, St. James, MO (US)

(73) Assignees: Rolls-Royce Corporation, Indianapolis, IN (US); The Curators of the University of Missouri, Columbia, MO (US)

( * ) Notice: Subject to any disclaimer, the term of this patent is extended or adjusted under 35 U.S.C. 154(b) by 627 days.

(21) Appl. No.: 14/720,438

(22) Filed: May 22, 2015

(65) Prior Publication Data
US 2016/0023957 A1    Jan. 28, 2016

Related U.S. Application Data

(63) Continuation-in-part of application No. 14/444,409, filed on Jul. 28, 2014.

(51) Int. Cl.
*B23K 1/00* (2006.01)
*C04B 37/00* (2006.01)
(Continued)

(52) U.S. Cl.
CPC .......... *C04B 37/003* (2013.01); *B23K 1/0018* (2013.01); *B23K 1/0056* (2013.01);
(Continued)

(58) Field of Classification Search
CPC . B23K 1/19; B23K 1/008; B23K 1/20; B23K 35/327; B23K 35/40;
(Continued)

(56) References Cited

U.S. PATENT DOCUMENTS 2,319,323 A    5/1943  Heyroth
2,484,650 A    10/1949  Ross, Jr.
(Continued)

FOREIGN PATENT DOCUMENTS

CN    101830731 A    9/2010
DE    102007010256 A1    9/2008
(Continued)

OTHER PUBLICATIONS

Czubarow et al. (Application of Poly(methylsilane) and Nicalon polycarbosilane precursors as binders for metal/ceramic powders in preparation of functionally graded materials, JOM, 1997 (Year: 1997).*

(Continued)

*Primary Examiner* — Erin B Saad
(74) *Attorney, Agent, or Firm* — Shumaker & Sieffert, P.A.

(57) ABSTRACT

In some examples, a technique may include positioning a first part comprising a ceramic or ceramic matrix composite and a second part comprising a ceramic or a CMC adjacent to each other to define a joint region at the interface of the first part and the second part. In some examples, the joint region may be heated using at least one of a laser or a plasma arc source to heat the joint region to an elevated temperature. The first and second parts may be pressed together and cooled to join the first and second parts at the joint region. In other examples, a solid braze material including a filler material and a metal or alloy may be delivered to the joint region and locally heated to cause a constituent of the filler (Continued)

material and a constituent of the metal or alloy to react. When reacted, the constituents may form a solid material, which may join the first and second parts.

27 Claims, 5 Drawing Sheets

(51) Int. Cl.
  *B23K 1/19* (2006.01)
  *B23K 1/005* (2006.01)
  *B23K 1/20* (2006.01)
(52) U.S. Cl.
  CPC .................. *B23K 1/19* (2013.01); *B23K 1/20* (2013.01); *C04B 2235/6562* (2013.01); *C04B 2235/6565* (2013.01); *C04B 2237/365* (2013.01); *C04B 2237/38* (2013.01); *C04B 2237/708* (2013.01); *C04B 2237/72* (2013.01)
(58) Field of Classification Search
  CPC .......... B23K 2203/16; B23K 2203/172; B23K 35/0244; B23K 1/00; B23K 1/0056
  USPC .............. 228/121, 56.3, 101, 245, 262.9, 46
  See application file for complete search history.

(56) References Cited

U.S. PATENT DOCUMENTS

| | | | |
|---|---|---|---|
| 3,762,835 A | 10/1973 | Carlson et al. | |
| 4,112,135 A | 9/1978 | Heaps et al. | |
| 5,139,594 A | 8/1992 | Rabin | |
| 5,164,247 A | 11/1992 | Solanki et al. | |
| 5,448,041 A | 9/1995 | Benoit et al. | |
| 5,455,206 A * | 10/1995 | Kaun .................... | C04B 35/547 252/387 |
| 5,534,091 A | 7/1996 | Okuda et al. | |
| 5,666,643 A | 9/1997 | Chesnes et al. | |
| 5,836,505 A | 11/1998 | Chaumat et al. | |
| 5,840,221 A | 11/1998 | Lau et al. | |
| 5,890,530 A | 4/1999 | Schmitt | |
| 5,942,064 A | 8/1999 | Krenkel et al. | |
| 5,975,407 A | 11/1999 | Gasse et al. | |
| 6,470,568 B2 | 10/2002 | Fried et al. | |
| 6,616,032 B1 * | 9/2003 | Gasse ...................... | B23K 1/19 148/22 |
| 7,222,775 B2 | 5/2007 | Chaumat et al. | |
| 7,318,547 B2 | 1/2008 | Gasse | |
| 7,389,834 B1 * | 6/2008 | Kembaiyan ........ | B23K 35/3006 175/435 |
| 8,678,269 B2 | 3/2014 | Chaumat et al. | |
| 8,763,883 B2 | 7/2014 | Chaumat et al. | |
| 9,056,369 B2 | 6/2015 | Chaumat et al. | |
| 9,623,504 B2 | 4/2017 | Park et al. | |
| 2006/0213064 A1 | 9/2006 | Katsumata et al. | |
| 2008/0039062 A1 * | 2/2008 | Laursen .................. | G06F 21/41 455/419 |
| 2008/0131665 A1 | 6/2008 | Suyama et al. | |
| 2008/0135530 A1 | 6/2008 | Lee et al. | |
| 2008/0190552 A1 | 8/2008 | Bouillon et al. | |
| 2008/0274362 A1 | 11/2008 | Kramer | |
| 2010/0075160 A1 | 3/2010 | Chaumat et al. | |
| 2010/0098551 A1 | 4/2010 | Pappert et al. | |
| 2011/0039219 A1 * | 2/2011 | Kressmann ............ | B23K 1/008 432/77 |
| 2012/0000890 A1 | 1/2012 | Ito et al. | |
| 2013/0004235 A1 | 1/2013 | Chaumat et al. | |
| 2013/0011185 A1 | 1/2013 | Chaumat et al. | |
| 2013/0064602 A1 | 3/2013 | Chaumat et al. | |
| 2015/0034604 A1 | 2/2015 | Subramanian et al. | |
| 2015/0083692 A1 | 3/2015 | Bruck | |
| 2015/0090773 A1 | 4/2015 | Schick et al. | |
| 2015/0275687 A1 | 10/2015 | Bruck et al. | |
| 2016/0023957 A1 | 1/2016 | Landwehr et al. | |
| 2016/0325368 A1 * | 11/2016 | Landwehr ................ | B23K 1/19 |

FOREIGN PATENT DOCUMENTS

| | | | |
|---|---|---|---|
| EP | 1127648 A2 | | 8/2001 |
| JP | 2003286087 A | * | 10/2003 |
| JP | 2003286087 A | | 10/2003 |

OTHER PUBLICATIONS

JP2003286087 computer english translation (Year: 2003).*
U.S. Appl. No. 14/444,409, titled "Ceramic-Ceramic Welds," filed Jul. 28, 2014.
U.S. Appl. No. 62/157,279, by Sean E. Landwehr et al., filed May 5, 2015.
Amendment in Response to Office Action dated Jan. 26, 2018, from U.S. Appl. No. 15/144,367, filed Apr. 25, 2018, 8 pages.
Office Action from U.S. Appl. No. 15/144,367, dated Jan. 26, 2018, 11 pp.
Notice of Allowance from U.S. Appl. No. 15/144,367, dated Jun. 6, 2018, 8 pp.
Notice of Allowance from U.S. Appl. No. 15/144,367, dated Sep. 17, 2018, 5 pp.
Notice of Allowance from U.S. Appl. No. 15/144,367, dated Jan. 11, 2019, 5 pp.

* cited by examiner

BRAZE FOR CERAMIC AND CERAMIC MATRIX COMPOSITE COMPONENTS

This application is a continuation-in-part of U.S. patent application Ser. No. 14/444,409, titled "CERAMIC-CERAMIC WELDS," and filed Jul. 28, 2014. The entire content of U.S. patent application Ser. No. 14/444,409 is incorporated herein by reference.

TECHNICAL FIELD

The present disclosure generally relates to brazes for joining ceramic or ceramic matrix composite components.

BACKGROUND

Some articles formed from ceramics or ceramic matrix composites (CMCs) are more easily formed out of multiple parts. For example the geometry of the article may be complex and may be difficult to form in a single piece. However, joining multiple parts formed of a ceramic or a CMC may be difficult, as the melting point of the ceramic or CMC may be very high, the ceramic or CMC may decompose before melting, and some ceramics or CMCs are susceptible to thermal shock due to their inherent brittleness.

Some ceramics or CMCs have been joined using a cement. However, cements may be prone to brittle fracture under tension or flexure, and may not be suitable for joining a ceramic or CMC to another material that has a substantially different coefficient of thermal expansion.

Other fasteners, such as screws or bolts, may be used to join ceramics or CMCs, but forming holes in ceramics or CMCs may introduce cracks in the ceramic or CMC, and the cracks may act as stress concentrators.

SUMMARY

In some examples, the disclosure describes a method that includes positioning a first part comprising a ceramic or CMC and a second part comprising a ceramic or a CMC adjacent to each other to define a joint region between adjacent portions of the first part and the second part. The method also may include delivering a solid braze material in the joint region, wherein the solid braze material comprises at least a filler material and a metal or alloy, wherein the solid braze material comprises at least one of a wire, ribbon, thread, rod, or strand. The method additionally may include locally heating the solid braze material, wherein a constituent of the filler material reacts with a constituent of the molten metal or alloy to join the first part and the second part.

In some examples, the disclosure describes an assembly including a first part comprising a ceramic or CMC and a second part comprising a ceramic or a CMC. The first part and second part may be positioned adjacent to each other to define a joint region between adjacent portions of the first part and the second part. The assembly also may include a solid braze material delivery device configured to deliver a solid braze material to the joint region. The solid braze material may include a filler material and a metal or alloy, and may be in the form of at least one of a wire, ribbon, thread, rod, or strand. A constituent of the filler material and a constituent of the metal or alloy react to join the first part and the second part when heated to a sufficient temperature. The assembly also may include a braze heat source configured to locally heat the solid braze material in the joint region.

In some examples, the disclosure describes a method including positioning a first part comprising a ceramic or ceramic matrix composite (CMC) and a second part adjacent to each other to define a joint region between adjacent portions of the first part and the second part. The method also may include locally heating, using at least one of a laser or a plasma arc source, the joint region to a temperature of at least about 0.3 times the melting temperature of the first part or the melting temperature of the second part. The method additionally may include pressing the first part and the second part together and cooling the joint region to result in the first and second parts being joined.

The details of one or more examples are set forth in the accompanying drawings and the description below. Other features, objects, and advantages will be apparent from the description and drawings, and from the claims.

DETAILED DESCRIPTION

The disclosure describes assemblies, systems, and techniques for joining a first part including a ceramic or a ceramic matrix composite (CMC) and a second part including a ceramic or a CMC using brazing or welding. In some examples, techniques described herein may include positioning a first part comprising a ceramic or ceramic matrix composite and a second part comprising a ceramic or a CMC adjacent to each other to define a joint region at the interface of the first part and the second part. In some examples, the joint region may be heated using at least one of a laser or a plasma arc source to heat the joint region to an elevated temperature. The first and second parts may be pressed together and cooled to join the first and second parts at the joint region.

In other examples, a solid braze material including a filler material and a metal or alloy may be delivered to the joint region and locally heated to cause a constituent of the filler material and a constituent of the metal or alloy to react. When reacted, the constituents may form a solid material, which may join the first and second parts.

Techniques described herein may facilitate joining of two parts each including a ceramic or a CMC. By facilitating joining of multiple parts, each including a ceramic or a CMC, components with complex geometry, large size, or both may be more easily made from a ceramic or a CMC, compared to forming the component from a single integral ceramic or CMC.

Techniques described herein also may utilize localized heating of the joint region. By locally heating the joint region, a majority of the volume of the first and second parts may remain at a lower temperature (e.g., if left unheated or if preheated to a lower temperature than the temperature to which the joint region is heated). In examples in which a braze is used, this may facilitate use of brazes that do not include a melting point suppressant, which in turn may improve high temperature capability of the component including the joined first and second parts.

Figure 1:
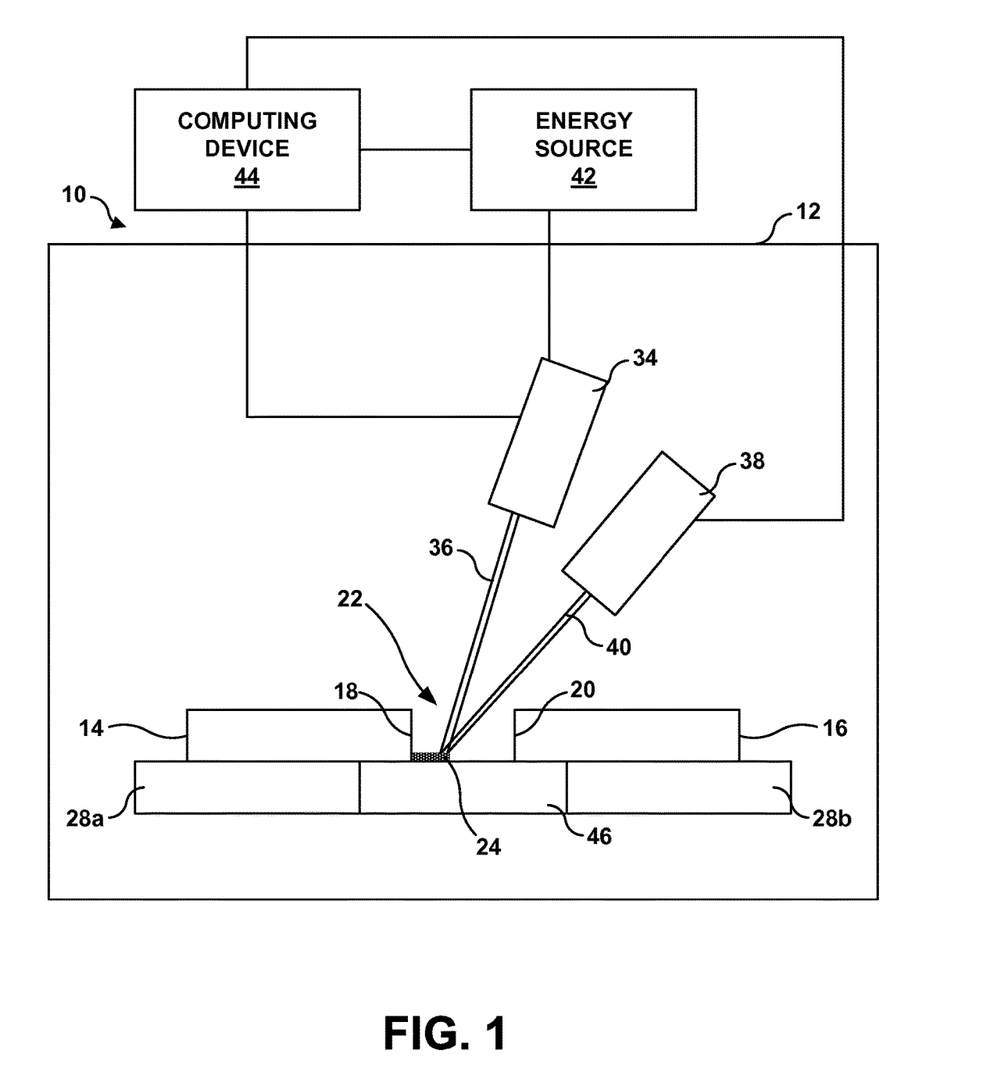
FIG. 1 is a conceptual and schematic diagram illustrating an example assembly for joining a first part including a ceramic or CMC and a second part including a ceramic or CMC using a powder including a filler material and a metal or alloy.

FIG. 1 is a conceptual and schematic diagram illustrating an example assembly 10 for joining a first part 14 including a ceramic or CMC and a second part 16 including a ceramic or CMC using a solid braze material 40 including a filler material and a metal or alloy. Assembly 10 may include an enclosure 12, which encloses an energy delivery head 34 and a material delivery device 38. Assembly 10 also may include an energy source 42, which is operatively coupled to energy delivery head 34. Assembly 10 further may include a computing device 44, which is communicatively connected to energy source 42, energy delivery head 34, and material delivery device 38. First part 14, second part 16, and at least one part heat source 28 are also positioned within enclosure 12.

In some examples, enclosure 12 may enclose an atmosphere that may reduce thermal degradation of first part 14, second part 16, and/or solid braze material 40 during processing. For example, enclosure 12 may enclose an atmosphere including an oxidant for oxide ceramics or an atmosphere including an inert gas or a reducing gas for non-oxide ceramics.

First part 14 and second part 16 may be parts that form a component of a high temperature mechanical system. For example, first part 14 and second part 16 may together be a blade track, an airfoil, a blade, a combustion chamber liner, or the like, of a gas turbine engine. In some examples, one or both of first part 14 and second part 16 may be part of a thermal protection system (TPS), a thermocouple, a hybrid ballistic armor system, a wear resistant or heat resistant surface, a refractory solar-absorptive ceramic surface for concentrated solar thermal applications, a bearing for high temperature applications (e.g., greater than about 1,000° C.), or the like.

In some examples, first part 14 and second part 16 include a ceramic or a CMC that includes Si. In some examples, first part 14 and second part 16 may include a silicon-based material, such as silicon-based ceramic or a silicon-based CMC.

In some examples in which first part 14 and second part 16 include a ceramic, the ceramic may be substantially homogeneous. In some examples, first part 14 and second part 16 that includes a ceramic includes, for example, silicon carbide (SiC), transition metal carbides (e.g., WC, $Mo_2C$, TiC), transition metal silicides ($MoSi_2$ $NbSi_2$, $TiSi_2$), or the like.

In examples in which first part 14 and second part 16 include a CMC, first part 14 and second part 16 include a matrix material and a reinforcement material. The matrix material includes a ceramic material, such as, for example, silicon metal or SiC. The CMC further includes a continuous or discontinuous reinforcement material. For example, the reinforcement material may include discontinuous whiskers, platelets, fibers, or particulates. As other examples, the reinforcement material may include a continuous monofilament or multifilament weave. In some examples, the reinforcement material may include SiC, C, or the like. In some examples, first part 14 and second part 16 each includes a SiC—Si or a SiC—SiC ceramic matrix composite. For example, first part 14, second part 16, or both may include a SiC—SiC composite consolidated using a silicon-containing alloy. In some examples, first part 14 and second part 16 may be formed of the same material (ceramic or CMC). In other examples, first part 14 may be formed of a different material than second part 16.

In some examples, one or both of first part 14 and second part 16 may be formed using at least one of hot pressing, physical vapor deposition (PVD), sputtering, chemical vapor deposition (CVD), plasma deposition, arc casting, sintering, melt infiltration, slurry infiltration, or the like. In some examples, first part 14, second part 16, or both may be nearly theoretically dense, such as greater than about 98% dense (no more than about 2% porosity, defined as the density of the part divided by the theoretical density of the part), or greater than about 99% dense (no more than 1% about porosity), or greater than about 99.5% dense (no more than about 0.5% porosity), or greater than about 99.9% dense no more than about 0.1% porosity).

Although FIG. 1 illustrates first part 14 and second part 16 as each defining a simple, substantially rectangular geometry, in other examples, first part 14, second part 16, or both may define a more complex geometry, including simple or complex curves, overhangs, undercuts, or the like.

First part 14 defines at least one joint surface 18. Similarly, second part 16 defines at least one joint surface 20. In some examples, joint surfaces 18 and 20 may define complementary shapes. FIG. 1 illustrates joint surfaces 18 and 20 as substantially flat surfaces. In other examples, joint surfaces 18 and 20 may define other, more complex shapes, including, for example, simple or complex curves, overhangs, undercuts, or the like.

First part 14 and second part 16 are positioned such that joint surfaces 18 and 20 are adjacent to each other and define a joint region 22. Joint region 22 may include any kind of joint, including, for example, at least one of a bridle joint, a butt joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joint surfaces 18 and 20 may have any corresponding geometries to define the surfaces of joint region 22.

In some examples, assembly 10 includes at least one part heat source 28. At least one part heat source 28 may be positioned and configured to heat at least one of first part 14 or second part 16. In some examples, at least one part heat source 28 may be used to heat at least one of first part 14 or second part 16 before introducing solid braze material 40 in joint region 22 or before locally heating solid braze material 40. In some examples, at least one part heat source 28 may heat at least one of first part 14 or second part 16 using convection, radiation, or conduction. In some examples, at least one part heat source 28 may be configured to heat at least one of first part 14 or second part 16 to a temperature between about 700° C. and about 1500° C., such as between about 700° C. and about 1100° C., or about 1000° C. The temperature to which at least one part heat source 28 heats at least one of first part 14 or second part 16 may be affected by the composition of the at least one of first part 14 or second part 16.

In some examples, at least one part heat source 28 may be configured to preheat, postheat, or both at least one of first part 14 or second part 16 to reduce a chance of cracking of first part 14 or second part 16 due to thermal shock. The thermal profile of the preheat, postheat, or both may be based at least in part on the composition of first part 14 or second part 16. For example, at least one of first part 14 or second part 16 may be heated to a temperature sufficient to plastically relieve stress in the at least one of first part 14 or second part 16, e.g., by microcracking, grain boundary sliding or softening, dislocation motion, twinning, grain growth, recrystallization, or the like. In some examples, the plastic stress relief may occur at a temperature at or above about 30% of the melting temperature of the ceramic or CMC material (e.g., the matrix material of the CMC), or between about 40% and about 50% of the melting temperature of the ceramic or CMC material (e.g., the matrix material of the CMC). The heating and cooling ramp rates may be selected based at least in part on a size of first part 14, second part 16, or both, a composition of first part 14, second part 16, or both, or the like. For example, larger parts 14 and 16 may be heated and cooled with a lower temperature rate. The temperature ramp rates may be selected to be sufficiently slow to avoid thermal shock to first part 14, second part 16, or both. In some examples, the temperature ramp rates may be about 2° C. per minute.

In some examples, assembly 10 includes a stop material 46, on which solid braze material 40 is initially delivered. Stop material 46 may maintain solid braze material 40 in joint region 22 during heating of solid braze material 40 until at least part of solid braze material 40 hardens. In some examples, stop material 46 includes a high temperature refractory material that is substantially non-reactive with constituents of solid braze material 40, first part 14, and second part 16 at the conditions that stop material 46, solid braze material 40, first part 14, and second part 16 are exposed to during use.

Energy source 42 may include, for example, a laser source, such as a CO laser, a $CO_2$ laser, a Nd:YAG laser; an electron beam source; a plasma source; a plasma arc torch; or the like. Energy source 42 may be selected to provide energy with a predetermined wavelength or wavelength spectrum that may be absorbed by solid braze material 40. In some examples, energy source 42 may be operatively connected to energy delivery head 34, which aims an energy beam 36 toward joint region 22 between first part 14 and second part 16 during joining of first and second parts 14 and 16.

Assembly 10 also may include at least one material delivery device 38. Material delivery device 38 may be configured to deliver braze material to joint region 22 in the form of a solid braze material 40, such as a wire, ribbon, thread, rod, strand, or the like. In some examples, material delivery device 38 is configured to deliver solid braze material 40 to the location 24 of joint region 22 at which energy beam 36 is aimed. Solid braze material 40 then may be heated by energy delivered by energy delivery head 34 to melt at least part of solid braze material 40.

In some examples, assembly 10 may include a single material delivery device 38, as shown in FIG. 1. In some of these examples, solid braze material 40 may include both a filler material and a metal or alloy, or may consist essentially of the filler material and the metal or alloy. In other examples, assembly 10 may include multiple material delivery devices 38. For example, a first material delivery device may deliver a first solid braze material that includes the filler material (with or without a binder material) to joint region 22 and a second material delivery device may deliver a second solid braze material including the metal or alloy (with or without a powder binder material) to joint region 22. The first and second material delivery devices may deliver the first and second solid braze materials substantially simultaneously, sequentially, or alternatingly to joint region 22. In examples in which assembly 10 includes multiple material delivery devices, assembly may include a single energy delivery head 34, more than one energy delivery head 34 (e.g., a respective energy delivery head 34 for each material delivery device), or the like.

In some examples, energy delivery head 34 may be coupled to or integral with material delivery device 38. For example, a device may include a central aperture through which energy beam 36 passes and which aims energy beam 36 and at least one structure through which solid braze material 40 is delivered. A single device that includes energy delivery head 34 and material delivery device 38 may facilitate delivery of solid braze material 40 and focusing of energy beam 36 at a substantially similar location 2. In other examples, material delivery device 38 may be separate from energy delivery head 34.

Solid braze material 40 may include a filler material, a metal or alloy and, optionally, a binder material. In some examples, solid braze material 40 consists essentially of the filler material and the metal or alloy. The filler material and the metal or alloy may together constitute the braze material. For example, the filler material may include a constituent that reacts with a constituent of the metal or alloy to form a solid and join first part 14 and second part 16.

In some examples, the filler material may include a ceramic material, one or more transition metals (e.g., titanium, cobalt, molybdenum, nickel, vanadium, chromium, copper, tantalum, niobium or yttrium, zirconium), carbon, or the like. Example ceramic materials for the filler material include transition metal carbides (e.g., molybdenum carbide, cobalt carbide, titanium carbide, tungsten carbide, vanadium carbide, niobium carbide, tantalum carbide, zirconium carbide or chromium carbide), transition metal borides (e.g., molybdenum boride, cobalt boride, titanium boride, tungsten boride, vanadium boride, niobium boride, tantalum boride, or chromium boride), transition metal silicides (e.g., titanium silicide, yttrium silicide, molybdenum silicide, or tungsten silicide), and SiC. In some examples, the filler material may include a mixture of at least two of these materials, such as SiC and a transition metal, SiC and carbon, or the like.

The filler material may be in the form of a powder, particulate, fiber, sheet, or the like, and is mixed in the solid carrier, such as a polymer, in the wire, ribbon, thread, rod, strand, or the like. In some examples, the filler material may include combinations of two or more of these forms, e.g., a fiber and a powder.

Solid braze material 40 also may include a metal or alloy. The metal or alloy includes a second constituent of the braze material, e.g., a constituent that reacts with a constituent of the filler material to join first and second parts 14 and 16. For example, the metal or alloy may include silicon metal, molybdenum metal, boron metal, titanium metal, tantalum metal, zirconium metal, a silicon-containing alloy, a molybdenum-containing alloy, a boron-containing alloy, a titanium-containing alloy, a tantalum-containing alloy, or a zirconium-containing alloy. The metal or alloy may be in the form of a powder, particulate, or the like.

In some examples, solid braze material 40 may include a binder, such as an organic binder. For example, the binder may bind powder particulate or fibers in a tape, an injection molded material, or the like. In some examples, the organic binder may include at least one of a high char yielding component or a preceramic polymer. In some examples, the high char yielding component may include a phenol or furan based organic material, such as furfuryl alcohol or phenol formaldehyde; a polycarbosilane; a polyarylacetylene based organic material; or the like. The high char yielding component may act as a carbon source during the brazing technique. In some examples, the preceramic polymer includes a polycarbosilane, which may be a precursor to SiC.

Computing device 44 may include, for example, a desktop computer, a laptop computer, a workstation, a server, a mainframe, a cloud computing system, or the like. Computing device 44 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 26 may be provided within dedicated hardware and/or software modules.

Computing device 44 is configured to control operation of assembly 60, including, for example, energy source 42, energy delivery head 34, and/or material delivery device 38. Computing device 44 may be communicatively coupled to at least one of energy source 42, energy delivery head 34, and/or material delivery device 38 using respective communication connections. Such connections may be wireless and/or wired connections.

Computing device 44 may be configured to control operation of energy delivery head 34, material delivery device 38, or both to position joint region 22 relative to energy delivery head 34, material delivery device 38, or both. For example, computing device 44 may control energy delivery head 34, material delivery device 38, or both to translate and/or rotate along at least one axis to energy delivery head 34, material delivery device 38, or both relative to joint region 22.

Computing device 44 may control at least one of the power level of energy source 42, the focal spot size of energy beam 36 delivered to joint region 22, the relative movement of the focal spot of energy beam 36 relative to joint region 22, a pause time between bursts of energy, the angle of energy beam 36 relative to joint region 22, or the like. In some examples, computing device 44 may control energy source 42 to deliver a welding current of between about 25 Amperes and about 75 Amperes with a duration of between about 5 seconds and about 20 seconds to joint region 22. Computing device 44 may control the at least one of these parameters to control the amount of heat delivered to solid braze material 40 at a given time. In some examples, computing device 44 may control energy delivery head 34 to scan (e.g., translate) relative to joint region 22 to scan the focal spot relative to joint region 22, and solid braze material 40 may be fused in a general shape corresponding to the scanned path of the focal spot.

In some examples, the joining techniques described herein may produce joints that exhibit substantially similar thermophysical and mechanical behavior as the parent material. In addition, in some examples, joints formed using the techniques described herein may able to withstand the substantially similar environments as the materials of first part 14 and second part 16, such as substantially similar corrosive, oxidizing, and/or high temperature environments.

Figure 2:
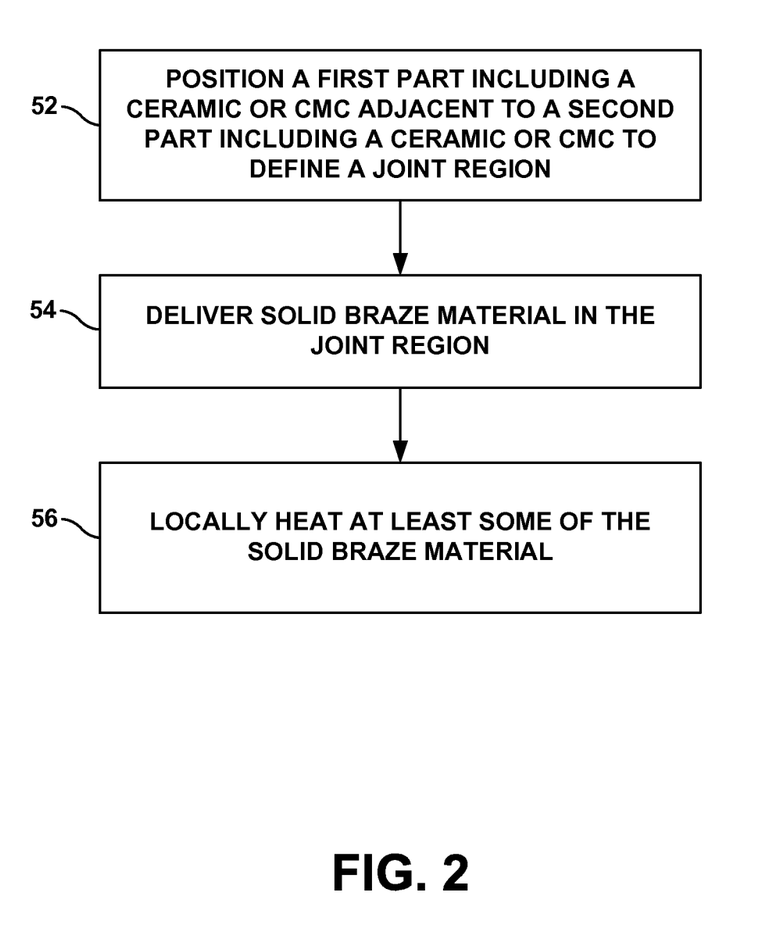
FIG. 2 is a flow diagram illustrating an example technique for joining a first part including a ceramic or CMC and a second part including a ceramic or CMC part using a powder including a filler material and a metal or alloy.

In accordance with examples of this disclosure, assembly 10 may be used to join first part 14 and second part 16. FIG. 2 is a flow diagram illustrating an example technique for joining first part 14 and second part 16 using a solid braze material 40 including a filler material and a metal or alloy. Although the technique of FIG. 2 will be described with concurrent reference to assembly 10 of FIG. 1, in other examples, the technique of FIG. 2 may be performed by another assembly.

The technique of FIG. 2 may include positioning first part 14 adjacent to second part 16 to define joint region 22 (52). As described above, first joint surface 18 and second joint surface 20 may define joint region 22, which may include any type of joint.

The technique of FIG. 2 also may include delivering, by material delivery device 38, under control of computing device 44, solid braze material 40 in joint region 22 (54). Solid braze material 40 may include a filler material, a metal or alloy, and, optionally, a binder. In some examples, solid braze material 40 may be deposited in joint region 22 by a single material delivery device 38. In other examples, solid braze material 40 may be deposited in joint region 22 by multiple material delivery devices, e.g., a first material delivery device that deposits a first solid braze material and a second material delivery device that deposits a second solid braze material. As described above, in examples in which a first solid braze material and a second solid braze material are delivered to joint region 22, the first solid braze material and the second solid braze material may be delivered substantially simultaneously, sequentially, or alternatingly.

The technique of FIG. 2 further may include locally heating, by energy delivery head 34, under control of computing device 44, at least some of solid braze material 40 (56). In some examples, the at least some of solid braze material 40 may be heated by energy delivery head 34 substantially as solid braze material 40 is delivered to joint region 22 (54) (e.g., at location 24). As solid braze material 40 is locally heated (56), a constituent of the metal or alloy in solid braze material 40 may react with a constituent of the filler material in solid braze material 40 to form a solid material. For example, the metal or alloy may include silicon metal or a silicon alloy and the filler material may include carbon or a carbon source. Silicon and carbon may react to form solid silicon carbide. The solid material, e.g., silicon carbide, may join first and second parts 14 and 16.

In some examples, such as when solid braze material 40 includes an organic binder including at least one of a high char carbon yielding component or a preceramic polymer, locally heating at least some of solid braze material 40 (56) may carbonize the high char carbon yielding component, form a ceramic from the preceramic polymer, or both. In some examples, the carbon from the high char carbon yielding component may react with a metal from the molten metal or alloy to form a ceramic.

Because material delivery device 38 delivers solid braze material 40 and energy delivery head 34 aims energy beam 36 at location 24, solid braze material 40 may be reacted to form a solid at location 24. Computing device 44 may control material delivery device 38 and energy delivery head 34 to scan location 24 within joint region 22 to add solid braze material 40 throughout joint region 22. After scanning location 24 throughout joint region 22, joint region 22 may be filled with solid material, and first part 14 and second part 16 may be joined by the solid material.

In some examples, as solid braze material 40 is deposited (54) and locally heated (56), forces may be exerted on first and second parts 14 and 16 to urge first joint surface 18 toward second joint surface 20, which may assist in joining first and second parts 14 and 16.

Additionally and optionally, during the technique of FIG. 2, computing device 44 may control at least one part heat source 28 to preheat at least one of first part 14 or second part 16, control cooling of at least one of first part 14 or second part 16, or both. In some examples, at least one part heat source 28 may be configured to heat at least one of first part 14 or second part 16 to a temperature between about 700° C. and about 1500° C., such as between about 700° C. and about 1100° C., or about 1000° C. The temperature to which at least one part heat source 28 heats at least one of first part 14 or second part 16 may be affected by the composition of the at least one of first part 14 or second part 16.

In some examples, computing device 44 may control at least one part heat source 28 to postheat at least one of first part 14 or second part 16 to reduce a chance of cracking of first part 14 or second part 16 due to thermal shock. For example, after locally heating at least some of solid braze material 40 (56), computing device 44 may control at least one part heat source 28 to heat at least one of first part 14 or second part 16 to a temperature sufficient to plastically relieve stress in the at least one of first part 14 or second part 16, e.g., by microcracking, grain boundary sliding or softening, dislocation motion, twinning, grain growth, recrystallization, or the like. In some examples, the plastic stress relief may occur at a temperature at or above about 30% of the melting temperature of the ceramic or CMC material (e.g., the matrix material of the CMC), or between about 40% and about 50% of the melting temperature of the ceramic or CMC material (e.g., the matrix material of the CMC). Computing device 44 also may control the temperature ramp rates during preheating, postheating, or both to avoid thermal shock to first part 14, second part 16, or both. In some examples, the temperature ramp rates may be about 2° C. per minute.

Figure 3:
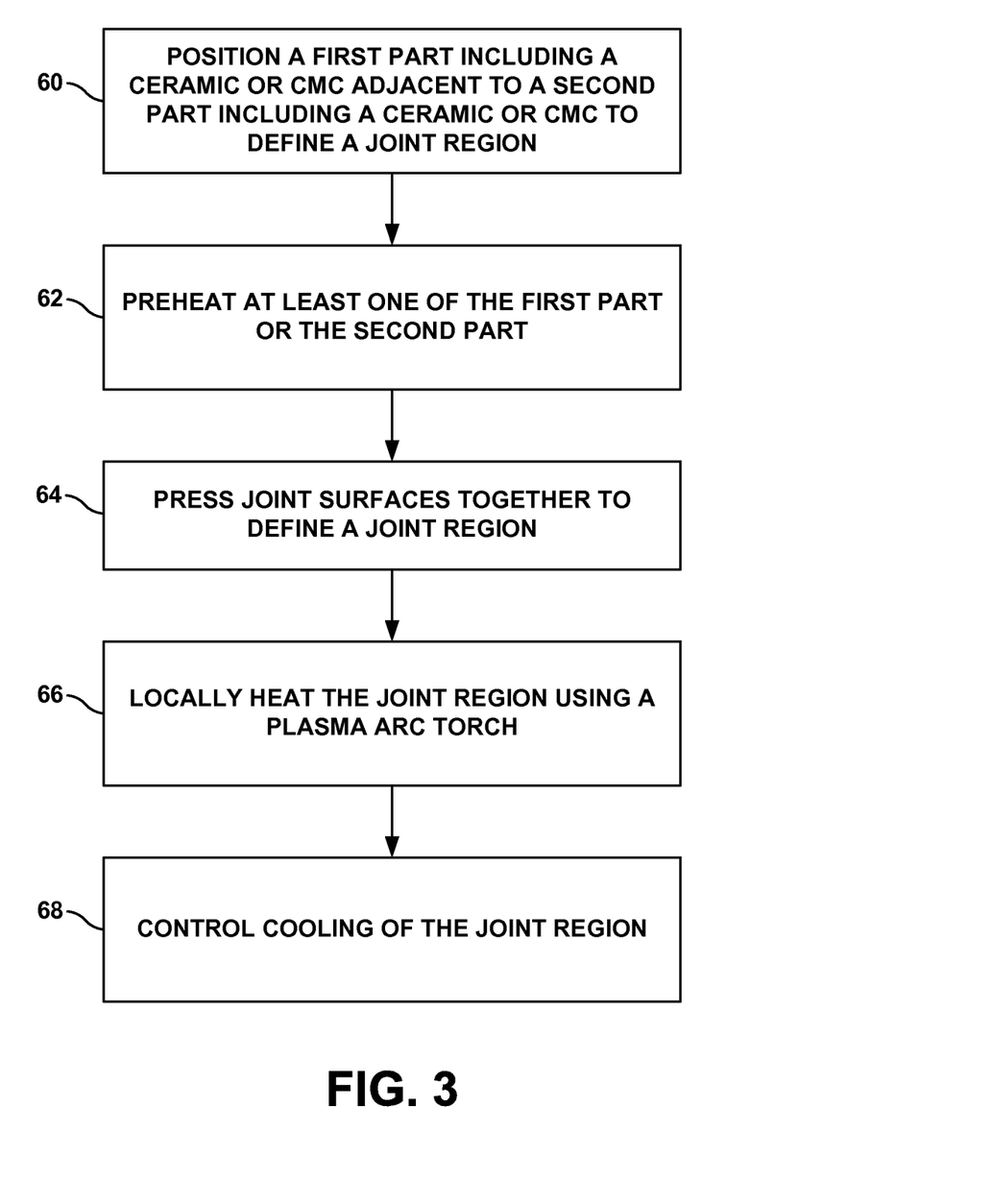
FIG. 3 is a flow diagram illustrating an example technique for joining a first part including a ceramic or CMC and a second part including a ceramic or CMC part using arc welding.

Although the preceding examples have been described as using solid braze material 40 to join first part 14 and second part 16, in other examples, first part 14 and second part 16 may be joined without using additional material. FIG. 3 is a flow diagram illustrating an example technique for joining first part 14 and second part 16 using arc welding. FIG. 3 will be described with concurrent reference to FIG. 4, which is a conceptual and schematic diagram illustrating an example assembly 70 for joining a first part 14 including a ceramic or CMC and a second part 16 including a ceramic or CMC using welding.

Figure 4:
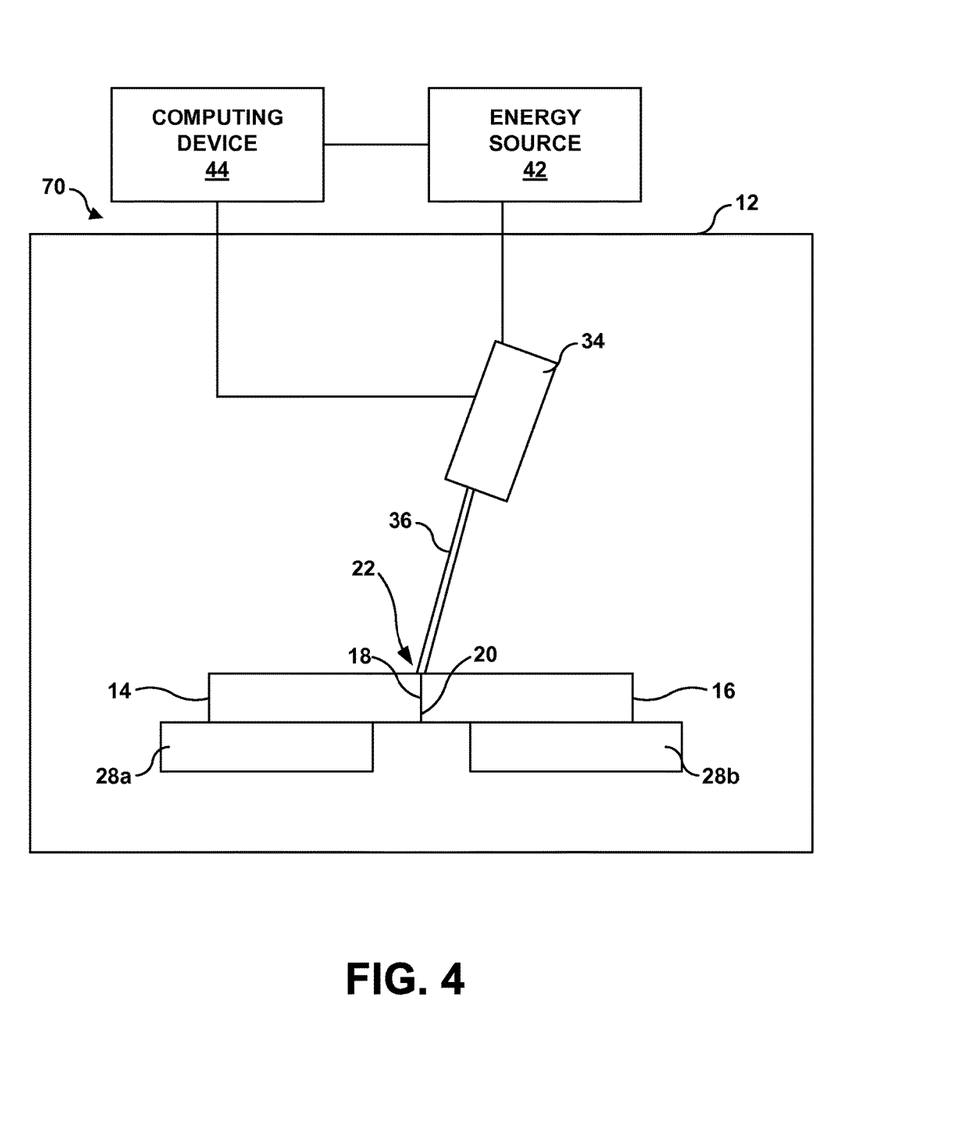
FIG. 4 is a conceptual and schematic diagram illustrating an example assembly for joining a first part including a ceramic or CMC and a second part including a ceramic or CMC using welding.

Assembly 70 may be similar to or substantially the same as assembly 10 of FIG. 1, aside from any differences described herein. For example, assembly 70 may include an enclosure 12, a first part 14, a second part 16, at least one part heat source 28, an energy source 42, an energy delivery head 34, and a computing device 44. Each of these components, in some examples, may be similar to or substantially the same as the like numbered components in assembly 10 of FIG. 1. Unlike assembly 10 of FIG. 1, assembly 70 may omit material delivery device 36, solid braze material 40. Additionally, unlike in assembly 10 of FIG. 1, first joint surface 18 of first part 14 and second joint surface 20 of second part 16 contact each other without intervening material (e.g., solid braze material 40).

The technique of FIG. 3 may include positioning first part 14 adjacent to second part 16 to define joint region 22 (60). As described above, first joint surface 18 and second joint surface 20 may define joint region 22, which may include any type of joint. Unlike in the technique of FIG. 2, in the technique of FIG. 3, first joint surface 18 of first part 14 and second joint surface 20 of second part 16 contact each other without intervening material, such that joint region 22 does not include material other than from first part 14 and second part 16.

In some examples, the technique of FIG. 3 optionally includes preheating, using at least one part heat source 28, at least one of first part 14 or second part 16 to a first elevated temperature (62). In some examples, at least one part heat source 28 may be configured to heat at least one of first part 14 or second part 16 to a temperature between about 700° C. and about 1500° C., such as between about 700° C. and about 1100° C., or about 1000° C. In some examples, the at least one of first part 14 or second part 16 may be maintained at the first elevated temperature for a predetermined first time. In some examples, the temperature ramp rate from ambient temperature to the first elevated temperature may be sufficiently slow to reduce or substantially eliminate thermal shock damage.

Once the first and second parts 14 and 16 are optionally heated (62), joint surfaces 18 and 20 may be urged or pressed together to define joint region 22 (64). For example, first and second parts 14 and 16 may be pressed together using a press, clamps, or the like. Pressing joint surfaces 18 and 20 together during welding may improve the weld by reducing drift or widening of the joint region 22.

The technique of FIG. 3 also includes locally heating, using energy source 42 and energy delivery head 34, joint region 22 to form an at least partially liquefied fusion volume (66). Energy source 42 and energy delivery head 34 may provide heat that is sufficient to at least partially liquefy the fusion volume but not sufficiently great and/or of such duration to significantly decompose material within joint region 22. In some examples, energy source 42 and energy delivery head 34 ramp up energy delivery (and, thus, heat) at a first welding heat ramp rate to a nominal welding heat level, hold the heat level at the nominal welding level for a predetermined time, and ramp down the heat at a second rate. In some examples, the heat provided by energy source 42 and energy delivery head 34 may be represented by a welding current of between about 25 Amperes and 75 Amperes with a duration of between about 5 seconds and about 20 seconds. In some examples, the heat provided by energy source 42 and energy delivery head 34 may result in a final, near surface temperature of between about 1400° C. and about 3500° C. with a duration of between about 5 seconds and about 20 seconds for spot welds or short (about 1 to about 2 centimeter) linear welds, and longer for longer linear welds.

The at least partially liquefied fusion volume is then cooled (e.g., at a predetermined cooling rate to a predetermined end temperature) (68) to define a fusion joint. In some examples, at least one part heat source 28 may be used to control the cooling rate of the at least partially liquefied fusion volume, e.g., to a rate of about 2° C./minute. The cooling rate may be sufficient to anneal the fusion joint and adjacent portions of first part and second part of thermally induced stresses, as described above.

EXAMPLE

Figure 5:
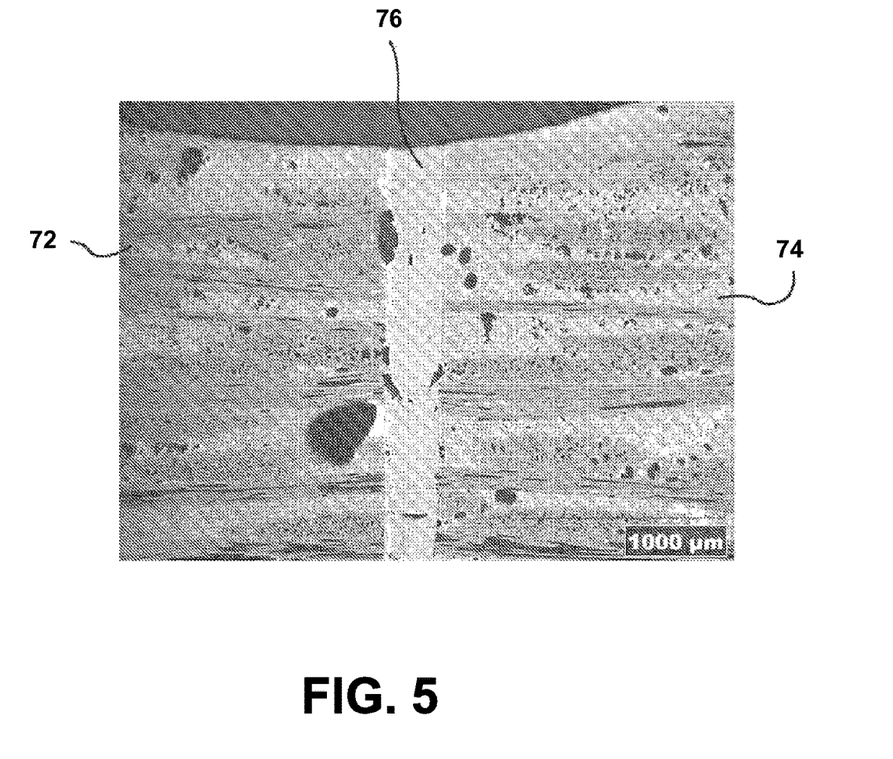
FIG. 5 is a photomicrograph of an example welded body including two SiC CMC parts joined with a fusion weld.

FIG. 5 is a photomicrograph of an example welded body including two SiC CMC parts 72 and 74 joined with a fusion weld 76. Two SiC ceramic parts 72 and 74 were positioned adjacent one another to define an interface. The surfaces were heated at a rate of about 2° C./minute and maintained at a first soak temperature of about 1000° C. A first carbon additive material in the form of a ten mil thick pressed SiC/polymer sheet was inserted into the interface volume and a second additive material was added to the surface of the surfaces adjacent the interface so as to wick into the interface during welding. The surfaces were clamped together to provide an urging force during welding. Additional heat was applied using a plasma welding torch current, ramped up to 55 amps at a rate of five (5) Amps per second from a pilot arc of twenty-five (25) Amps to a welding current of fifty-five (55) Amps and maintained for a duration of ten (10) seconds, followed by a five (5) second ramp down to yield an at least partially liquid fusion volume. The fusion volume was cooled at a rate of about 2° C./minute until it reached a predetermined end temperature at which point the fusion volume had solidified to yield a fusion weld 76.

Various examples have been described. These and other examples are within the scope of the following claims.

What is claimed is:

1. A method comprising:
positioning a first part comprising a ceramic or ceramic matrix composite (CMC) and a second part comprising a ceramic or a CMC adjacent to each other to define a joint region between adjacent portions of the first part and the second part;
delivering a solid braze material in the joint region, wherein the solid braze material comprises at least a filler material, an organic binder comprising a preceramic polymer, and a metal or alloy, and wherein the solid braze material comprises at least one of a wire, ribbon, thread, rod, or strand; and
locally heating, using at least one of a laser or a plasma arc source, the solid braze material, wherein a constituent of the filler material reacts with a constituent of the molten metal or alloy to join the first part and the second part.

2. The method of claim 1, wherein locally heating the solid braze material comprises locally heating the solid braze material substantially simultaneously with delivering the solid braze material in the joint region.

3. The method of claim 1, wherein at least one of the first part or the second part comprises a silicon carbide-silicon carbide composite.

4. The method of claim 1, wherein the filler material comprises at least one of silicon carbide, carbon, a transition metal, a transition metal carbide, a transition metal boride, or a transition metal silicide.

5. The method of claim 1, wherein the filler material comprises at least one of particulates or fibers.

6. The method of claim 5, wherein the filler material comprises at least one of SiC, carbon, a transition metal, a transition metal carbide, a transition metal boride, or a transition metal silicide.

7. The method of claim 1, wherein the metal or alloy comprises at least one of silicon metal, molybdenum metal, boron metal, titanium metal, tantalum metal, zirconium metal, a silicon-containing alloy, a molybdenum-containing alloy, a boron-containing alloy, a titanium-containing alloy, a tantalum-containing alloy, or a zirconium-containing alloy.

8. The method of claim 1, wherein the organic binder further comprises at least one of a furan based organic, a phenol based organic, a polycarbosilane, or a polyarylacetylene based organic material.

9. The method of claim 1, wherein the preceramic polymer comprises a polycarbosilane.

10. The method of claim 1, wherein the solid braze material comprises a first solid braze material comprising the filler material and a second solid braze material comprising the metal or alloy.

11. The method of claim 10, wherein the first solid braze material and the second braze material are delivered to the joint region substantially simultaneously.

12. The method of claim 10, wherein the first solid braze material and the second braze material are delivered to the joint region alternatingly.

13. The method of claim 1, further comprising heating at least one of the first part or the second part prior to locally heating the solid braze material.

14. The method of claim 1, further comprising heating at least one of the first part or the second part after locally heating the solid braze material to control cooling of the at least one of the first part or the second part.

15. A method comprising:
positioning a first part comprising a ceramic or ceramic matrix composite (CMC) and a second part comprising a ceramic or a CMC adjacent to each other to define a joint region between adjacent portions of the first part and the second part;
delivering a solid braze material in the joint region, wherein the solid braze material comprises at least a filler material, an organic binder, and a metal or alloy, and wherein the solid braze material comprises at least one of a wire, ribbon, thread, rod, or strand, and wherein the organic binder comprises at least one of a furan based organic, a phenol based organic, a polycarbosilane, or a polyarylacetylene based organic material; and
locally heating, using at least one of a laser or a plasma arc source, the solid braze material, wherein a constituent of the filler material reacts with a constituent of the molten metal or alloy to join the first part and the second part.

16. The method of claim 15, wherein locally heating the solid braze material comprises locally heating the solid braze material substantially simultaneously with delivering the solid braze material in the joint region.

17. The method of claim 15, wherein at least one of the first part or the second part comprises a silicon carbide-silicon carbide composite.

18. The method of claim 15, wherein the filler material comprises at least one of silicon carbide, carbon, a transition metal, a transition metal carbide, a transition metal boride, or a transition metal silicide.

19. The method of claim 15, wherein the filler material comprises at least one of particulates or fibers.

20. The method of claim 19, wherein the filler material comprises at least one of SiC, carbon, a transition metal, a transition metal carbide, a transition metal boride, or a transition metal silicide.

21. The method of claim 15, wherein the metal or alloy comprises at least one of silicon metal, molybdenum metal, boron metal, titanium metal, tantalum metal, zirconium metal, a silicon-containing alloy, a molybdenum-containing alloy, a boron-containing alloy, a titanium-containing alloy, a tantalum-containing alloy, or a zirconium-containing alloy.

22. The method of claim 15, wherein the solid braze material comprises a first solid braze material comprising the filler material and a second solid braze material comprising the metal or alloy.

23. The method of claim 22, wherein the first solid braze material and the second braze material are delivered to the joint region substantially simultaneously.

24. The method of claim 22, wherein the first solid braze material and the second braze material are delivered to the joint region alternatingly.

25. The method of claim 1, wherein the solid braze material consists essentially of the filler material and the metal or alloy.

26. The method of claim 15, further comprising heating at least one of the first part or the second part prior to locally heating the solid braze material.

27. The method of claim 15, further comprising heating at least one of the first part or the second part after locally heating the solid braze material to control cooling of the at least one of the first part or the second part.

* * * * *